United States Patent [19]  
Fujii

[11] Patent Number: 4,883,266  
[45] Date of Patent: Nov. 28, 1989

[54] AUTOMATIC DOCUMENT FEEDER IN ELECTROPHOTOGRAPHIC COPYING MACHINE

[75] Inventor: Yoshihal Fujii, Sakurai, Japan

[73] Assignee: Sharp Kabushiki Kaisha, Osaka, Japan

[21] Appl. No.: 212,041

[22] Filed: Jun. 23, 1988

Related U.S. Application Data

[63] Continuation of Ser. No. 68,802, Jun. 29, 1987, abandoned, which is a continuation of Ser. No. 877,392, Jun. 23, 1986, abandoned.

[30] Foreign Application Priority Data

Jul. 16, 1985 [JP] Japan ................................. 60-159141

[51] Int. Cl.$^4$ ........................................... B65H 39/10
[52] U.S. Cl. ..................................... 271/291; 271/301; 271/902
[58] Field of Search ................ 271/186, 291, 902, 301

[56] References Cited

U.S. PATENT DOCUMENTS

| | | | |
|---|---|---|---|
| 4,186,662 | 2/1980 | Borneman | 271/902 X |
| 4,431,303 | 2/1984 | Hoffman | 271/902 X |
| 4,456,237 | 6/1984 | Buddendeck | 271/291 X |
| 4,579,326 | 4/1986 | Pinckney | 271/291 X |

Primary Examiner—Ricahrd A. Schacher  
Attorney, Agent, or Firm—Flehr, Hohbach, Test, Albritton & Herbert

[57] ABSTRACT

An automatic document feeder in an electrophotographic copying machine for making copies of both sides of a document comprises a passageway for a document to pass through, a driving roller adapted to rotate in both normal and reverse directions and a rotatable drum. A document which has been fed is transported through the passageway by the roller rotating in the normal direction and is wrapped around the drum to reach a scanning position. After the scanning for copying operation, the document is led into the same passageway by revese rotation of the driving roller but the document is then in an upside down position such that when the roller is operated in the normal direction again, the document is wrapped around the drum with its backside exposed to the scanning light. Thus, both sides of a document can be scanned automatically.

5 Claims, 1 Drawing Sheet

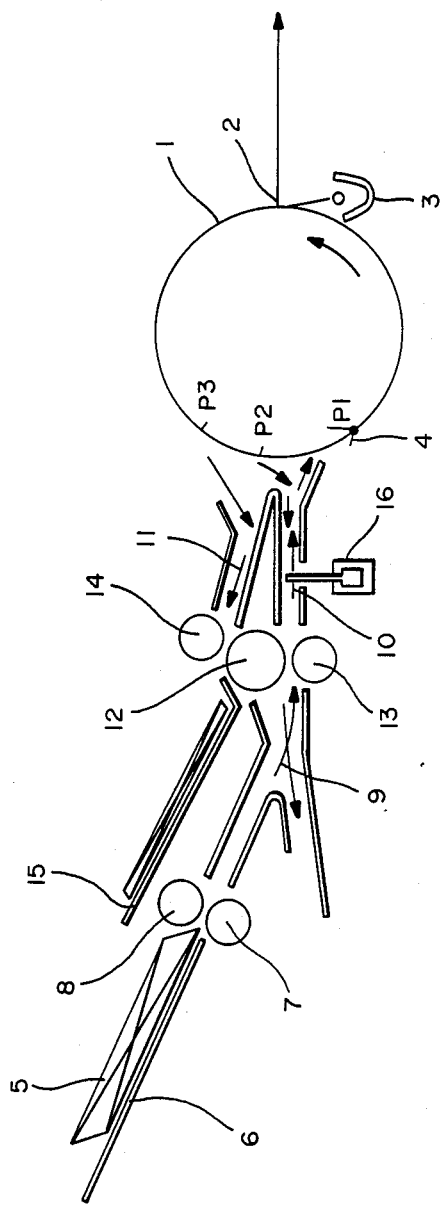
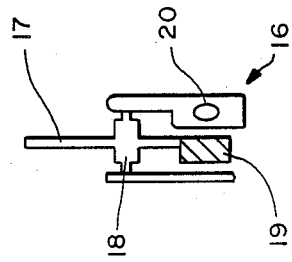
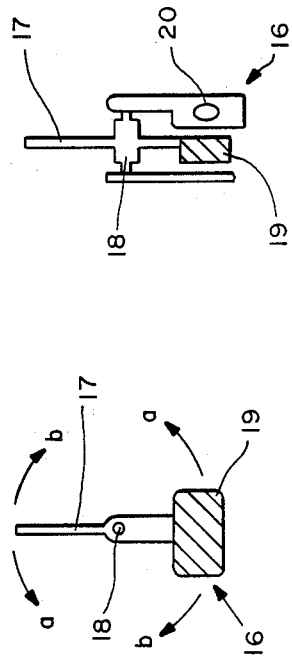
FIG.—1
FIG.—3
FIG.—2

AUTOMATIC DOCUMENT FEEDER IN ELECTROPHOTOGRAPHIC COPYING MACHINE

This is a continuation of application Ser. No. 068,802 filed June 29, 1987 now abandoned; which is a continuation of Ser. No. 877,392, filed June 23, 1986, now abandoned.

BACKGROUND OF THE INVENTION

This invention relates to an electrophotographic copying machine adapted to copy both sides of a document and more particularly a device for turning over and transporting a document in an electrophotographic copying machine of such a type.

Most document feeders in an electrophotographic copying machine are designed on the assumption that a copy or copies are made only of one side of a document. For this reason, they transport a document to a scanning position and discharge it after its printed has been scanned. Such an automatic document feeder, however, cannot be used efficiently when it is desired to copy both sides of a document. If it is desired to copy both sides of a document, therefore, the feeder must be provided with means for turning over a document after one side thereof has been scanned and transporting it again to the scanning position for the second scanning. For this reason, prior art document feeders for a copying machine adapted to copy two sides of a document are provided with a turning device for turning over a document, a passageway for transporting a turned document to the scanning position once again and a device for transferring the document through this passageway. This makes prior art document feeders of this type inconveniently large and structurally complicated.

SUMMARY OF THE INVENTION

It is therefore an object of the present invention to provide an automatic document feeder with a simple structure which can simplify the operation of copying both sides of a document.

It is another object of the present invention to provide an automatic document feeder which can handle copying of both sides of a document as well as copying of only one side.

The above and other objects of the present invention are achieved by providing an automatic document feeder in an electrophotographic copying machine which comprises a passageway for a document to pass through, document transporting means and document circulating means such that a document fed from a tray and transported through the passage way to a scanning position where it is scanned by a light beam for copying operation is subsequently returned to the same passageway backwards but in an upside down position. When the document is transported again to the scanning position, therefore, the back surface of the document is scanned so that both sides of a document can be copied automatically by using the same transporting and circulating means both for feeding a document and for turning it over.

BRIEF DESCRIPTION OF THE DRAWINGS

The accompanying drawings, which are incorporated in and form a part of the specification, illustrate one embodiment of the present invention and, together with the description, serve to explain the principles of the invention. In the drawings:

FIG. 1 is a sectional view of an automatic document feeder embodying the present invention, FIG. 2 is a front view of a document detector according to the present invention, and FIG. 3 is a side view of the document detector of FIG. 2.

DETAILED DESCRIPTION OF THE INVENTION

Reference being made to FIG. 1 which shows a sectional view of an automatic document feeder of the present invention, numeral 1 indicates a drum for wrapping a document therearound an transporting it to a scanning position 2 and numeral 3 indicates a light source for projecting a light beam incident on the document at the scanning position 2. The beam of light reflected by a document at the scanning position 2 is projected onto a recording medium (not shown) through an optical system including a lens and mirrors (not shown). The drum 1 is provided with a document holder piece 4 for holding a transported document wrapped around the drum 1. The holder piece 4 is in an open position when the drum 1 is as shown in FIG. 1 with the holder piece 4 at a position $P_1$, but becomes closed as soon as a document is transported to the holder piece 4. The holder piece 4 remains in this closed condition while the drum 1 rotates, causing the document to rotate with the drum 1. After the document has been scanned at the scanning position 2, the holder piece 4 opens and releases the document when it reaches a position $P_2$ or $P_3$ as will be explained below.

Documents 5 to be transported to the drum 1 are originally stacked on a tray 6 which is provided with a feed roller 7 for sending off documents 5 sequentially from the bottom and a separation roller 8 opposite thereto for preventing two or more documents from becoming sent out simultaneously. Between the tray 6 and the drum 1 are a first passageway 9 and a second passageway 10 for transporting a document from the tray 6 to the drum 1 by means of guiding plates, as well as a third passageway 11 for discharging a document which has been scanned. At the junction between the first and the second passageways 9 and 10 is a synchronization roller 12 for feeding a document from the tray 6 such that it will come to the position of the holder piece 4 on the drum 1. The synchronization roller 12 is positioned so as to appear also in the third passageway 11 and serves to transport a document from the drum 1 to an appropriately disposed discharge tray 15. Follower rollers 13 and 14 are provided opposite to the synchronization roller 12 respectively in the second and third passageways 10 and 11.

In the second passageway 10, there is provided a detector 16 for detecting the motion of a document which is being transported therethrough. As shown in FIGS. 2 and 3, this detector 16 has an arm 17 protruding into the second passageway 10 so as to detect not only a document being transported to the drum 1 but also a document being transported from the drum 1. The arm 17 is supported rotatably around an axis 18 such that it can rotate in the direction of the second passageway 10. A magnet 19 is attached to the arm 17 on the side away from the second passageway 10 and there is provided a lead switch 20 opposite to this magnet 19. When a document passes inside the second passageway 10 and the arm 17 is caused to rotate in the direction of a or b as indicated by arrows in FIG. 2, the magnet 19 moves away from the lead switch 20 and thereby activates the lead switch 20 to detect the passage of a document in the second passageway 10. This detector 16 is utilized for controlling the motion of the synchronization roller 12 such as rotation in a normal direction, rotation in a reverse direction and stopping.

The operation, or the control program, of the document feeder described above will be explained below. First, documents 5 to be copied are placed on the tray 6 with the image-carrying sides towards the bottom, that is, facing the direction of the tray 6. If the feed roller 7 is operated then, the documents 5 on the tray 6 are sequentially fed into the first passageway 9, starting with the sheet at the bottom, or the sheet directly opposite to the tray 6. At this moment, the separation roller 8 serves to push the next sheet immediately above the one being fed back towards the tray 6 such that only the bottom one of the documents 5 on the tray 6 will enter the first passageway 9 to reach the synchronization roller 12 and its follower roller 13. The motion of this sheet is provided by the feed roller 7 until it reaches the position of the synchronization roller 12. The synchronization roller 12 is operated in synchronism with the feed roller 7 and sends the document into the second passageway 10. This motion of the document is detected by the detector 16 in the second passageway 10 and the motion of the synchronization roller 12 and hence that of the document is temporarily halted such that the front edge of the document will arrive at the designated position $P_1$ at a desired timing with respect to the holding piece 4 on the drum 1 and become engaged therewith.

The drum 1 stops its rotation when it is detected that its holding piece 4 has arrived at the position $P_1$. Prior art means for detecting the angular position of a drum may be utilized for this purpose such as by detecting a slit provided on a disk mounted coaxially with the drum. When the holder piece 4 reaches the position $P_1$ and the drum 1 is stopped, the holder piece 4 is opened as shown in FIG. 1 and waits for the arrival of a document. In other words, the temporarily stopped synchronization roller 12 is restarted when the drum 1 reaches the position shown in FIG. 1 and the feeding of the document is resumed. During this period of time, the feed roller 7 remains stationary to prevent the next sheet from entering the passageways.

When the document reaches the position $P_1$, the holder piece 4 is closed to hold the front edge of the document and the drum 1 begins to rotate, causing the document to become wrapped around its surface and brings it to the scanning position 2. After the scanning is repeated a predetermined number of times according to an inputted total number of copies desired, the holder piece 4 is opened to release the document. The holder piece 4 is opened when it reaches the position $P_3$ shown in FIG. 1 such that the released document will be led into the third passageway 11 by its own weight and discharged into the discharge tray 15, sandwiched between the synchronization roller 12 and its follower roller 14. The explanation of the operation given above is for the case of copying only one side of a document. The operation when it is desired to scan both sides of a document will be explained next.

Initial operations are the same as in the case of copying only one side of a document. That is, documents 5 on the tray 6 are sequentially fed from the bottom and the image on the front side (facing down on the tray 6) is exposed to the light beam from the source 3. After the front side is scanned, however, the document is discharged from the drum 1 when the holder piece 4 reaches the position $P_2$. When the holder piece 4 opens at the position $P_2$ to release the document, the front edge of the released document does not enter the third passageway 11 but is led into the second passageway 10 formed by guide plates. In other words, the document now returns to the second passageway 10, lying in the upside down position with respect to the position when it was first introduced into the second passageway 10 from the tray 6 prior to the scanning of the first side. This reentry of the document into the second passageway 10 is detected by the detector 16 and this causes the synchronization roller 12 to rotate in the reverse direction, sending the document generally in the direction of the tray 6 but into another passageway below the first passageway 9. The synchronization roller 12 stops when the back edge of the document is detected by the detector 16.

In the meantime, the drum 1 continues to rotate until the holder piece 4 reaches the position $P_1$. As explained above, this causes the holder piece 4 to open and the synchronization roller 12 to start rotating in the normal direction, that is, in the direction for moving the document towards the drum 1. In this case, the back edge of the document, which is now upside down, reaches the drum 1 first and becomes engaged with the holder piece 4. As soon as the holder piece 4 is closed, the drum 1 begins to rotate for another cycle of scanning operation. Since the document is in the upside down position this time, the back side is now exposed by the light from the source 3.

When the scanning of the back side of the document is thus completed, the holder piece 4 opens when it reaches the position $P_3$ to release the document. The document, as explained above, is thereby led into the third passageway 11 and discharged by the synchronization roller 12 and the follower roller 14 into the discharge tray 15. In the meantime, the drum 1 continues to rotate until the holder piece 4 reaches the position $P_1$ and waits for the next document to arrive. This series of operations is repeated and subsequent documents are piled up sequentially on the discharge tray 15.

The foregoing description of a preferred embodiment of the invention has been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intened to be included within the scope of this invention.

What is claimed is:

1. An automatic document feeder in a copying machine comprising
   an endless document recycling path having thereon a document receiving position at which a document is introduced into said recycling path and a document releasing position where a document is released from said recycling path,
   document circulating means for transporting a document through said recycling path in a fixed direction from said document receiving position to said document releasing position,
   a passageway with one end disposed near said document receiving position and said document releasing position, and
   document transporting means for transporting a document through said passageway selectably in a normal direction towards said document receiving position or in a reverse direction opposite to said normal direction from said document releasing position, said recycling path, said passageway and said document circulating means being so arranged with respect to one another that a document which is transported in said reverse direction through said passageway after moving through said recycling path is facing oppositely to when said document is transported in said normal direction through said passageway prior to moving into and through said recycling path.

2. The automatic document feeder of claim 1 wherein said transporting means comprise a roller and said passageway contains a detector for detecting motion of a document inside said passageway.

3. The automatic document feeder of claim 1 wherein said document circulating means comprise a rotatable drum around which a document fed or transported by said document transporting means is adapted to be wrapped, said drum having a means for removably attaching said document around said drum.

4. The automatic document feeder of claim 3 wherein said attaching means is adapted to release said document selectively at a first position such that said document returns to said passageway or at a second position such that said document is discharged into a discharge tray means.

5. The automatic document feeder of claim 1 wherein said recycling path also has an exposure position where a document being transported through said recycling path can be exposed to light, said exposure position being downstream from said document receiving position along said fixed direction.

* * * * *